United States Patent
Banks et al.

(10) Patent No.: US 12,259,046 B2
(45) Date of Patent: *Mar. 25, 2025

(54) WATER CONSERVATION FAUCETS

(71) Applicant: NOTCH2O LLC, Sherman Oaks, CA (US)

(72) Inventors: Sydney Banks, Pacific Palisades, CA (US); Sadie May, Los Angeles, CA (US); Cara Banks, Pacific Palisades, CA (US); Tessa May, Los Angeles, CA (US)

(73) Assignee: NOTCH2O LLC, Sherman Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/405,838

(22) Filed: Jan. 5, 2024

(65) Prior Publication Data
US 2024/0142007 A1    May 2, 2024

Related U.S. Application Data

(63) Continuation of application No. 17/521,562, filed on Nov. 8, 2021, now Pat. No. 11,867,300.

(60) Provisional application No. 63/111,564, filed on Nov. 9, 2020.

(51) Int. Cl.
| F16K 11/078 | (2006.01) |
| E03C 1/04 | (2006.01) |
| F16K 37/00 | (2006.01) |

(52) U.S. Cl.
CPC ............ *F16K 11/0782* (2013.01); *E03C 1/04* (2013.01); *F16K 37/0008* (2013.01)

(58) Field of Classification Search
CPC .............. F16K 11/078; F16K 11/0782; F16K 37/0008; E03C 1/04; E03C 1/0412
USPC ........ 4/675–678; 137/625.17, 625.4, 625.41; 251/205, 207–209, 231, 251, 264, 314
See application file for complete search history.

(56) References Cited

U.S. PATENT DOCUMENTS

| 9,103,102 B1 | 8/2015 | Prabhakar |
| 9,228,675 B2 | 1/2016 | Chen |
| 9,328,489 B2 | 5/2016 | Prabhakar |
| 9,677,254 B2 | 6/2017 | Prabhakar |
| 2006/0016491 A1 | 1/2006 | Rosko |
| 2018/0195258 A1 | 7/2018 | Ientile |

FOREIGN PATENT DOCUMENTS

| WO | WO-2013072909 A1 * | 5/2013 | ........... E03C 1/0412 |
| WO | WO 2019/066858 A1 | 4/2019 | |

* cited by examiner

*Primary Examiner* — Tuan N Nguyen
(74) *Attorney, Agent, or Firm* — Martin & Ferraro, LLP

(57) ABSTRACT

A water conservation faucet seamlessly integrating a tactile feedback mechanism into existing faucets to spur user controlled pre-set water flow rate, energy conservation, and cost savings. During movement of the handle, the user receives tactile feedback through the handle indicating the position of the handle as it moves from one pre-set position to the next. In addition to tactile feedback, the handle provides visual feedback to the user as the handle remains in the fixed position until the user chooses to move handle to another position.

12 Claims, 14 Drawing Sheets

FIG. 20

WATER CONSERVATION FAUCETS

CROSS REFERENCE TO RELATED APPLICATIONS

The present application is a continuation of U.S. patent application Ser. No. 17/521,562, filed Nov. 8, 2021, which claims the benefit of U.S. Provisional Patent Application No. 63/111,564, filed Nov. 9, 2020, all of which are incorporated by reference herein in their entirety.

BACKGROUND

As the world's population increases and climate change alters weather patterns to disrupt water sources and stores, water utilization and conservation continues to be a critical issue impacting everyone across the world.

More specifically, climate change causes more extreme drought, which negatively impacts the available water supply. Decreased snowfall yields a reduced snowpack, and earlier melting means less available water extending into summer months. As soils dry and are compacted, rain is not as readily absorbed which leads to higher levels of contaminants in our water and agriculture. Moreover, when people do not have easy and ready access to a safe water source, respiratory and gastrointestinal diseases proliferate at higher rates.

The more water people consume, the more water is required to be treated. Water treatment uses a substantial amount of energy. For example, water treatment in California alone uses roughly twenty percent of the state's total energy use. Thus, water use and conservation have broad environmental ripples.

As a consequence of climate change, people will need to alter their consumption behaviors and use water more wisely to prepare for more frequent and persistent periods of limited water supply. There is a need to empower and educate people to conserve water and consume less energy. There is a further need to cultivate and train water consumers to develop intentional water conservation-oriented consumption behaviors.

There have been legislative efforts to encourage and mandate water conservation. For example, the California legislature has passed acts such as the Energy Policy Act of 1992, the California Energy Commission of 2015, and California's Green Building Standards Code: A4.303.1. But additional efforts are required to address the impact of climate change and drought and hit California's "55 by 25" with limited mandated water rationing.

Existing water conservation efforts lower usage, but new product support is needed. There is a particular need for an easy-to-use and effective way to regulate water usage that results in water conservation by consumers.

Conventional water faucets inherently waste water as users typically turn them on without being consciously aware of how much water is flowing. Thus, with great frequency, more water than is needed is used for a particular task. Even a small reduction in the water flow rate each time a faucet is used will have a significant cumulative effect on overall water consumption and conservation.

Providing a way to adjust and train user behavior to consistently and easily adjust water flow rate for tasks not requiring the maximum is a significant step toward water conservation. For the situations in which maximum flow rate is more effective or desired, a maximum flow rate would be permitted and remain in the control of the consumer.

There have been attempts to mitigate this problem with devices such as aerators and regulators to restrict water flow to a fixed rate that is not adjustable by the consumer (i.e. they do not rely on human behavior). Such systems have not been well received and can result in the consumer removing the restrictor or often running the water longer than necessary, which defeats the conservation goal.

Other systems exist where mechanical modification of the valve mechanism to provide preset adjustable flow rates in a single lever faucet have been proposed with less than desirable results. Such systems are not intuitive and require multiple actions by the consumer to move from the various flow rate positions. Such systems also require a redesign of existing faucet control mechanisms, the addition of multiple new parts, new manufacturing tooling, and/or expensive component replacements. These would all significantly increase the cost to the consumer and decrease the likelihood of consumer adoption, either voluntarily or by legislative mandate.

There is a need for a faucet control system consistent with natural human behavior that stimulates conscious consumption by tactile or visual feedback to reduce water usage with zero consumer impact. Such a system could be legislatively mandated for widespread adoption.

SUMMARY

The present invention addresses the foregoing needs by seamlessly integrating a tactile feedback mechanism into existing faucets to spur user controlled pre-set water flow rate, energy conservation, and cost savings.

In an embodiment in accordance with the present invention, there is provided a lever faucet having a handle, a spigot, and a body. Within the body is a flow valve assembly for controlling the flow of both cold water and hot water with a single lever from the faucet. The flow of water can be regulated to deliver hot water only, cold water only, or a mixture thereof by rotational movement of the lever about its longitudinal axis. The flow rate can be controlled from and "off" (0% flow) position to a "maximum on" (100% flow) position, or at flow rates therebetween by moving the lever between the off and maximum on positions.

As the handle is moved from the off position towards the maximum on position, the user feels a "click" sensation through the handle which provides a tactile feedback mechanism indicating to the user that that handle is in the first position.

In a preferred embodiment, when the handle is in the first fixed position the water flow rate is at approximately 33% of the maximum flow of water in the maximum on position for the faucet. The handle is further moved toward the maximum on position and stops in the second position. In the second position, the water flow rate is approximately 66% of the maximum for the faucet.

During movement of the handle, the user receives tactile feedback through the handle indicating the position of the handle as it moves from one pre-set position to the next. In addition to tactile feedback, the handle provides visual feedback to the user as the handle remains in the fixed position until the user chooses to move handle to another position.

When the handle is further moved toward the maximum on position, the handle eventually reaches its maximum travel. At this point, the handle cannot move any further and is at the maximum on position for the faucet. In the maximum on position, the water flow rate is 100%.

In another embodiment, the faucet has a knob, a spigot, and a body. Within the body is a flow valve assembly for controlling the flow of water from the faucet. The flow rate can be controlled from an "off" (0% flow) position to a "maximum on" (100% flow) position, or at flow rates therebetween by rotating knob between the off and maximum on positions.

In use, as the knob is rotated from the off position towards the maximum on position toward a first fixed position. The user feels a "click" sensation through the knob which provides a tactile feedback mechanism indicating to the user that the knob is in first position. In a preferred embodiment of the faucet, when the knob is in the first fixed position, the water flow rate is at approximately 33% of the maximum flow of water in maximum on position for the faucet.

When the knob is further rotated toward the maximum on position, the knob reaches and stops in the second position. The user again feels a "click" sensation through the knob which provides a tactile feedback mechanism indicating to the user that the knob is in the second position, where the water flow rate is approximately 66% of the maximum for the faucet.

During rotation of the knob, the user receives tactile feedback through the knob indicating the position of the knob as it moves from one fixed position to the next.

When the knob is further rotated toward the maximum on position, the ball exits the second position and the knob eventually reaches its maximum travel. At this point, the knob cannot move any further and is at the maximum on position. In the maximum on position, the water flow rate is 100% for the faucet.

In each of the first position and second position, the handle or knob remains in a fixed, pre-set position until it is moved by the user and eventually returned by the user to the off position. This permits the user to continue using the faucet while knowing the specific flow rate of the water flow by feeling that the handle is fixed in a desired position. In each of the fixed positions, the faucet delivers specific water flow rates of 33%, 66%, and 100%, respectively, to stimulate conscious consumption behavior and reduce water usage with zero consumer impact.

In another embodiment, the faucet has two rotatable handles, a spigot, and a body. Within the body is a flow valve assembly for controlling the flow of water from the faucet. The flow rate can be controlled from an "off" (0% flow) position to a "maximum on" (100% flow) position, or at flow rates therebetween by rotating the handles between the off and maximum on positions. Typically, one handle would be used to control the flow of a cold water supply and the other handle would be used to control the flow of a hot water supply. Hot water and cold water would flow through the same spigot either individually or combined when flowing at the same time.

Each handle controls the operation of a valve assembly respectively, the valve assembly has a stem, typically housed within a bonnet, and has detent grooves formed in stem. In a preferred embodiment, the grooves are annular at least in part encircling a portion of the stem. The bonnet may include plunger bore configured to receive ball plunger body therein. When the ball plunger is positioned within the bore, a ball is oriented to face and is maintained in a biased position to contact the surface of the stem. The grooves are sized and configured to receive a portion of ball when positioned therein.

In use, the handles are rotated between the off position to the maximum on position. When a handle is in the off position, the flow rate is 0% and no water is flowing from the faucet. As the handle is moved from the off position towards the maximum on position, the ball travels along the surface of stem into a detent groove and is in a first fixed position. When the ball rolls (or slides) into the detent groove, the user feels a click sensation through the handle from the ball of the spring biased ball plunger being seated in the groove which provides a tactile feedback mechanism indicating to the user that that handle is in a first fixed position. In a preferred embodiment of the faucet, when the handle is in the first fixed position the water flow rate is at approximately 33% of the maximum flow of water in the maximum on position.

When the handle is further rotated toward the maximum on position, the ball moves out of the detent groove and travels along the surface of the stem between two detent grooves to reach a second detent grove and stops in a second fixed position. In the second fixed position, the water flow rate is approximately 66% of the maximum on position.

During rotation of handle, the user receives tactile feedback through the handle indicating the position of the handle as it moves from one groove and into the next groove. In addition to tactile feedback, the handle provides visual feedback to the user as the handle remains in the fixed position until the user chooses to move handle to another position.

When the handle is further rotated toward the maximum on position, the ball exits the second detent groove and contacts the surface of stem and the handle eventually reaches its maximum travel. At this point, the handle cannot move any further and is at the maximum on position. In the maximum on position, the water flow rate is 100%.

In each of the first position, second position, and maximum on position, handle the remains in a fixed position until it is moved by the user and eventually returned by the user to the off position. This permits the user to continue using the faucet while knowing the specific flow rate of the water flow by looking at the position of the handle and feeling that handle is fixed in a desired position. In each of the fixed positions, the faucet delivers specific water flow rates of 33%, 66%, and 100%, respectively, to stimulate conscious consumption behavior and reduce water usage with zero consumer impact.

The present invention can be incorporated into the structure of new faucets with minimal alteration of the faucet and minimal change to existing tooling. The present invention can also be in the form of a retrofit kit that can be applied to faucets already in use. For example, in single lever faucets a replacement kit would include a new handle and valve body cover incorporating the features of the present invention while still utilizing the remainder of the existing faucet. In rotating knob faucets, a replacement valve assembly could include the features of the present invention to replace existing valve assemblies while utilizing the remainder of the existing faucet.

BRIEF DESCRIPTION OF THE DRAWINGS

So that the present invention may be more readily understood, embodiments of the present invention will now be described, by way of example, with reference to the accompanying drawings, in which:

FIG. 20 is a table which summarizes some of the benefits and advantages in accordance with the present invention.

DETAILED DESCRIPTION

Figure 1A:
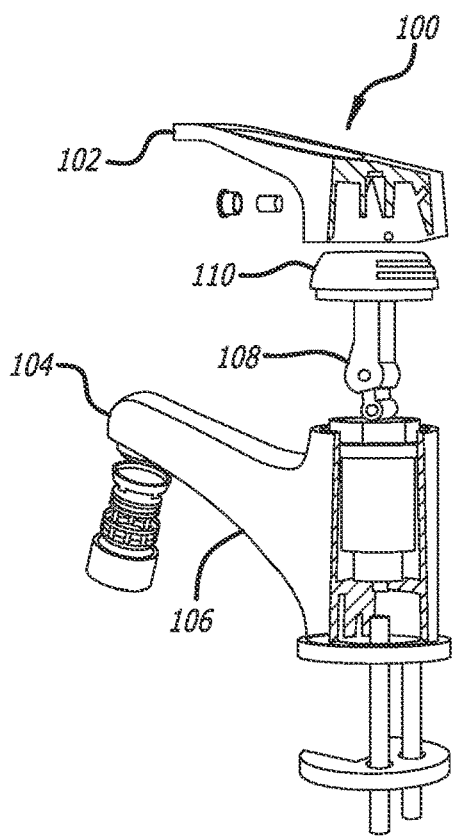
FIG. 1A is a rear, side elevational view in partial cross section of a lever faucet in accordance with the present invention.
Figure 1B:
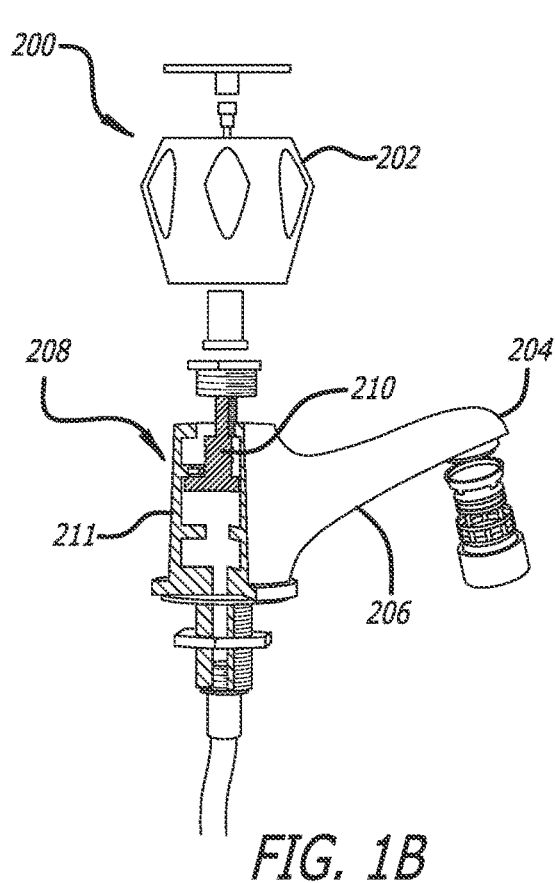
FIG. 1B is a rear, side elevational view in partial cross section of a knob faucet in accordance with the present invention.
Figure 2A:
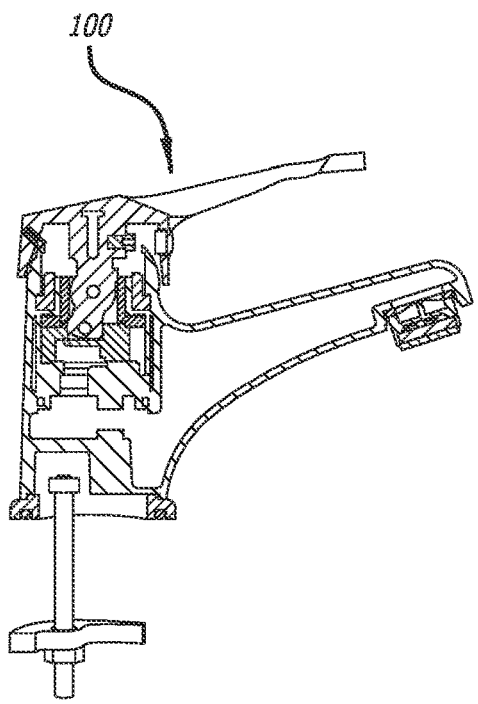
FIG. 2A is a partial cross-sectional side view of the lever faucet in FIG. 1A showing the ball plunger and groove system in accordance with the present invention.
Figure 2B:
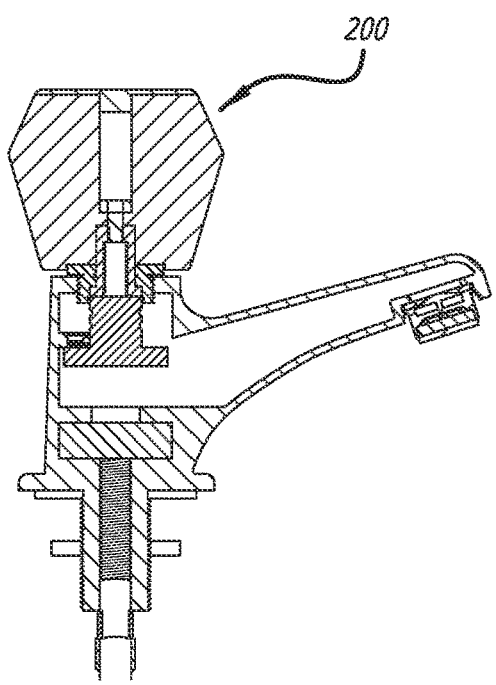
FIG. 2B is a partial cross-sectional side view of the knob faucet in FIG. 1B showing the ball plunger and groove system in accordance with the present invention.

Aspects of the present disclosure are best understood from the following detailed description when read with the accompanying Figures. It is noted that, in accordance with the standard practice in the industry, various features are not drawn to scale. In fact, the dimensions of the various features may be arbitrarily increased or reduced for clarity of discussion.

The following disclosure provides many different embodiments, or examples, for implementing different features of the provided subject matter. Specific examples of components, applications and arrangements are described below to simplify the present disclosure. These are, of course, merely examples and are not intended to be limiting. For example, the attachment of a first feature and a second feature in the description that follows may include embodiments in which the first feature and the second feature are attached in direct contact, and may also include embodiments in which additional features may be positioned between the first feature and the second feature, such that the first feature and the second feature may not be in direct contact. In addition, the present disclosure may repeat reference numerals and/or letters in the various examples. This repetition is for the purpose of simplicity and clarity and does not in itself dictate a relationship between the various embodiments and/or configurations discussed.

This disclosure establishes improved aspects of a water conservation faucet system designed for home use or commercial use. In order to more accurately regulate water usage, the present invention provides an elegant and simple to use solution to control and set a faucet to an appropriate flow rate suitable for the intended use.

FIGS. 1A-2B show examples of a lever faucet 100 and a knob faucet 200, respectively, in accordance with embodiments of the present invention. These embodiment are representative examples of two types of commonly known faucets. It is appreciated that variations thereof exist such that the present invention is not limited to the embodiments described herein.

As shown, lever faucet 100 has a handle 102, a spigot 104, and a body 106. Within body 106 is a flow valve assembly 108 for controlling the flow of both cold water and hot water with a single lever from faucet 100. The flow of water can be regulated to deliver hot water only, cold water only, or a mixture thereof by rotational movement of the lever about its longitudinal axis. The flow rate can be controlled from an "off" (0% flow) position to a "maximum on" (100% flow) position, or at flow rates therebetween by moving the lever between the off and maximum on positions.

Figure 3:
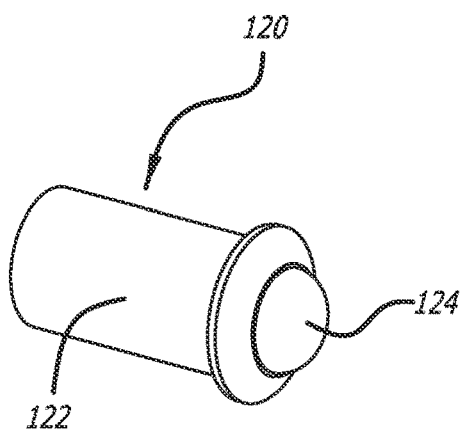
FIG. 3 is a perspective view of a ball plunger assembly in accordance with the present invention.
Figure 4:
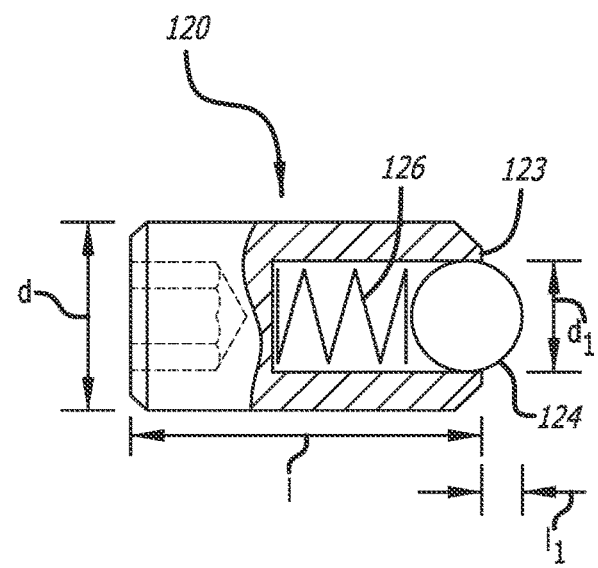
FIG. 4 has a cross-sectional view of the ball plunger assembly shown in FIG. 3.

Referring to FIGS. 3 and 4, an embodiment of a ball plunger assembly 120 is shown. Ball plunger assembly 120 preferably includes a ball plunger body 122 having an opening 123 at one end. Ball 124 is biased by a spring mechanism 126 such that a portion of ball 124 protrudes from opening 123 and extends from body 122. Sufficient tension is provided by spring 126 to bias ball 124 in position proximate the open end of body 122 while also permitting ball 124 to rotate relative to body 122. It is appreciated that in an embodiment, ball 124 could include an anti-rotation feature or element such as a tail to impede, limit, or restrict rotation of ball 124 relative to body 122. In this manner, ball 124 could be maintained in a desired position relative to body 122 suitable for its intended purposed.

Figure 5:
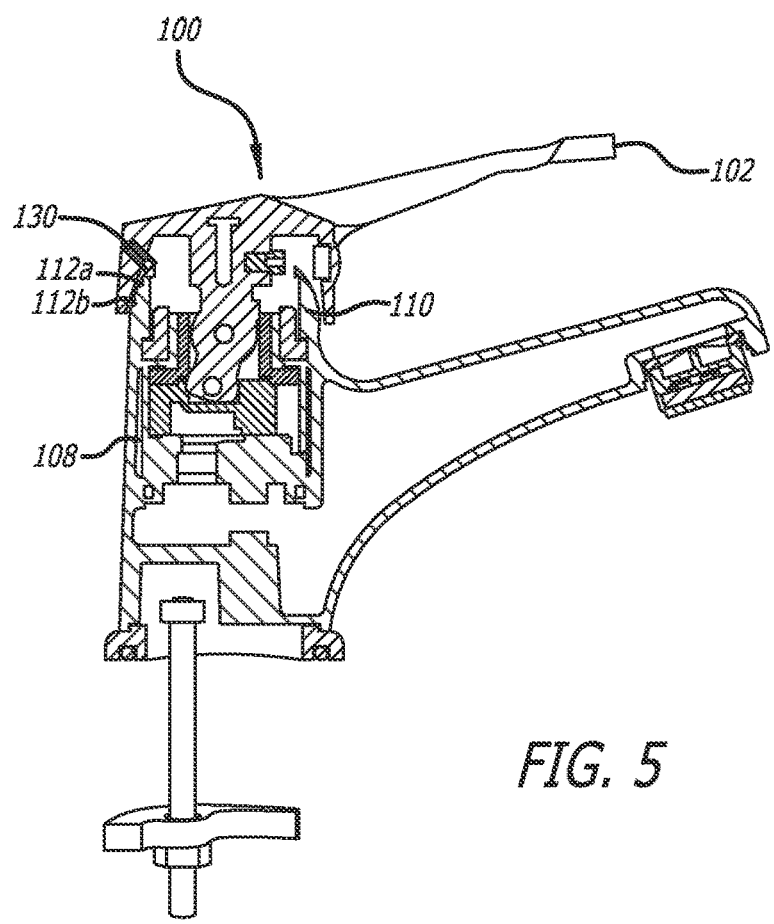
FIG. 5 is a partial cross-sectional side view of the lever faucet in accordance with the present invention.
Figure 6:
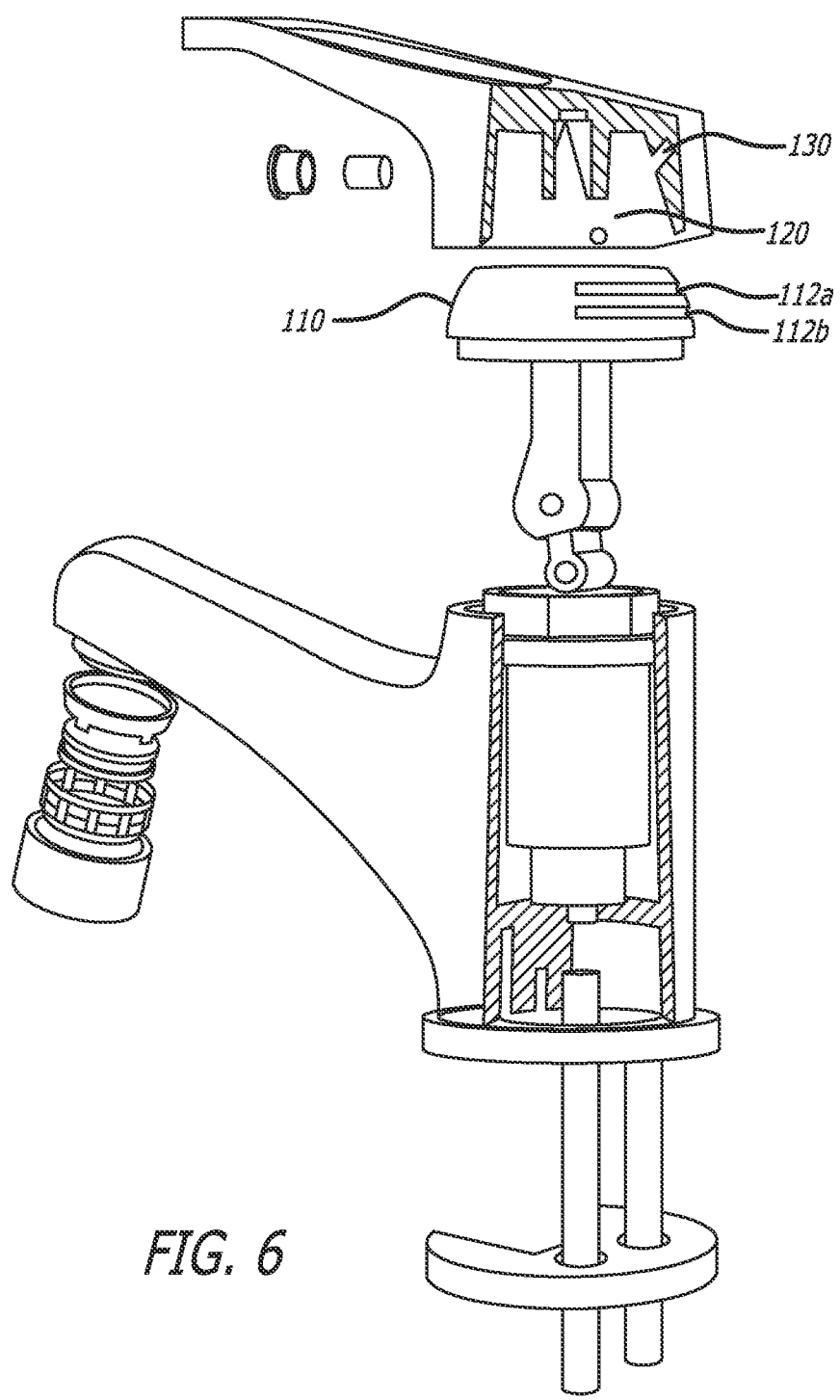
FIG. 6 is a partial cross-sectional, rear, side elevation view of the lever faucet in accordance with the present invention.
Figure 7:
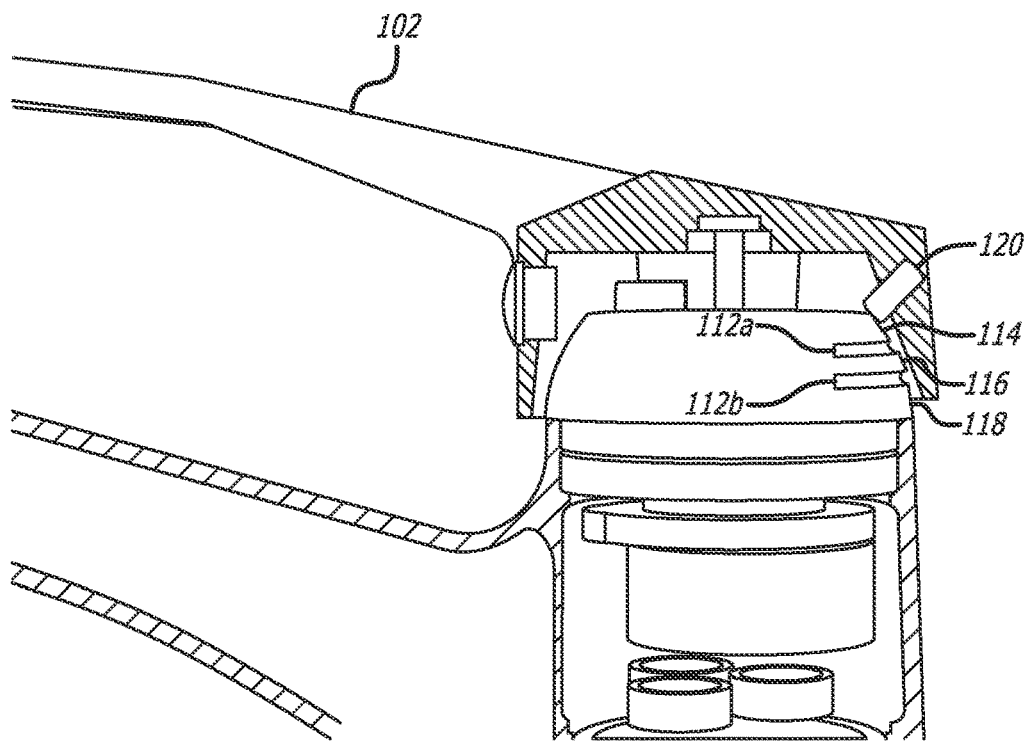
FIG. 7 is an enlarged partial cross-sectional of view of the lever faucet illustrating the ball plunger in the off position with the flow of water being 0% in accordance with the present invention.
Figure 8:
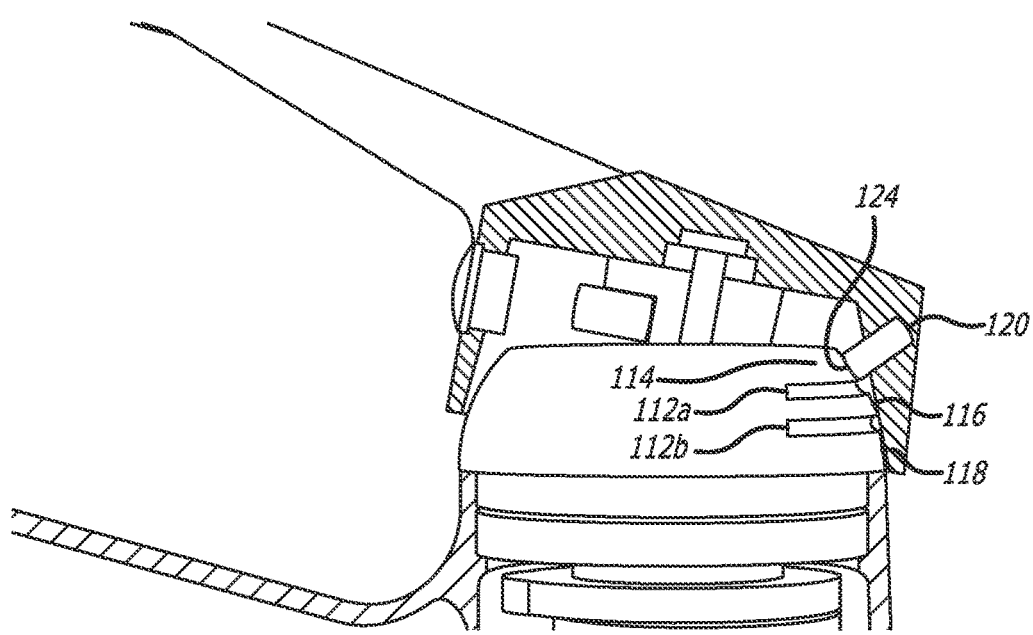
FIG. 8 is an enlarged partial cross-sectional view of the lever faucet illustrating the ball plunger being moved from the off position toward the first position in accordance with the present invention.
Figure 9:
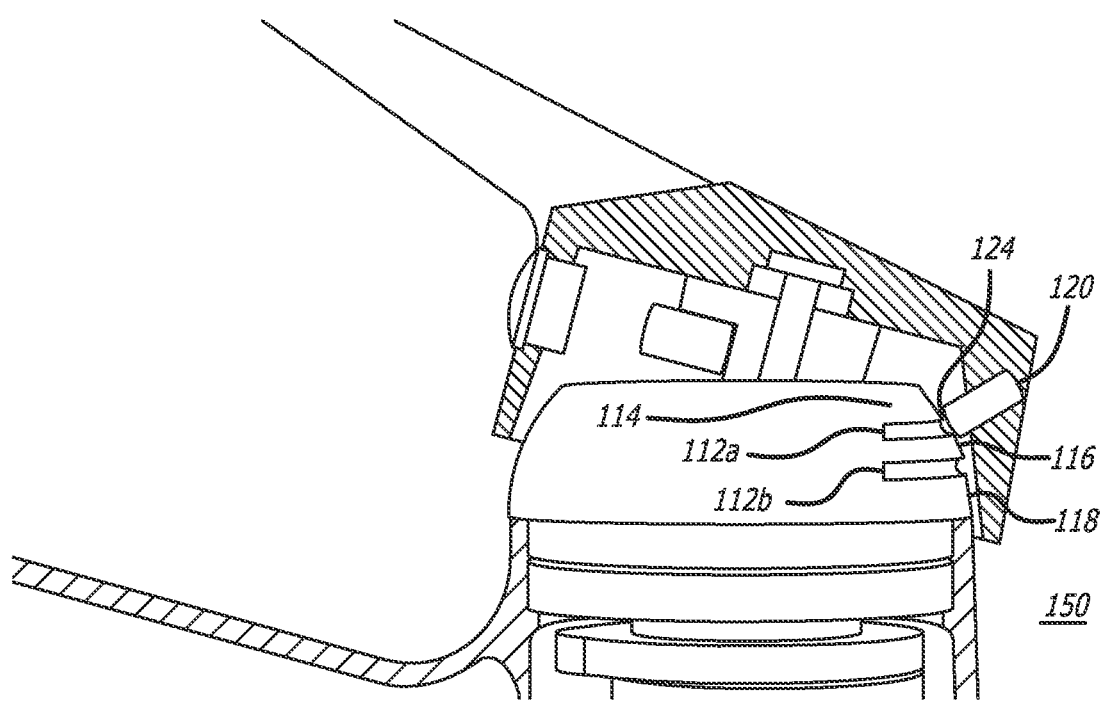
FIG. 9 is an enlarged partial cross-sectional view of the lever faucet illustrating the ball plunger in the first position with the flow of water being approximately 33% in accordance with the present invention.
Figure 10:
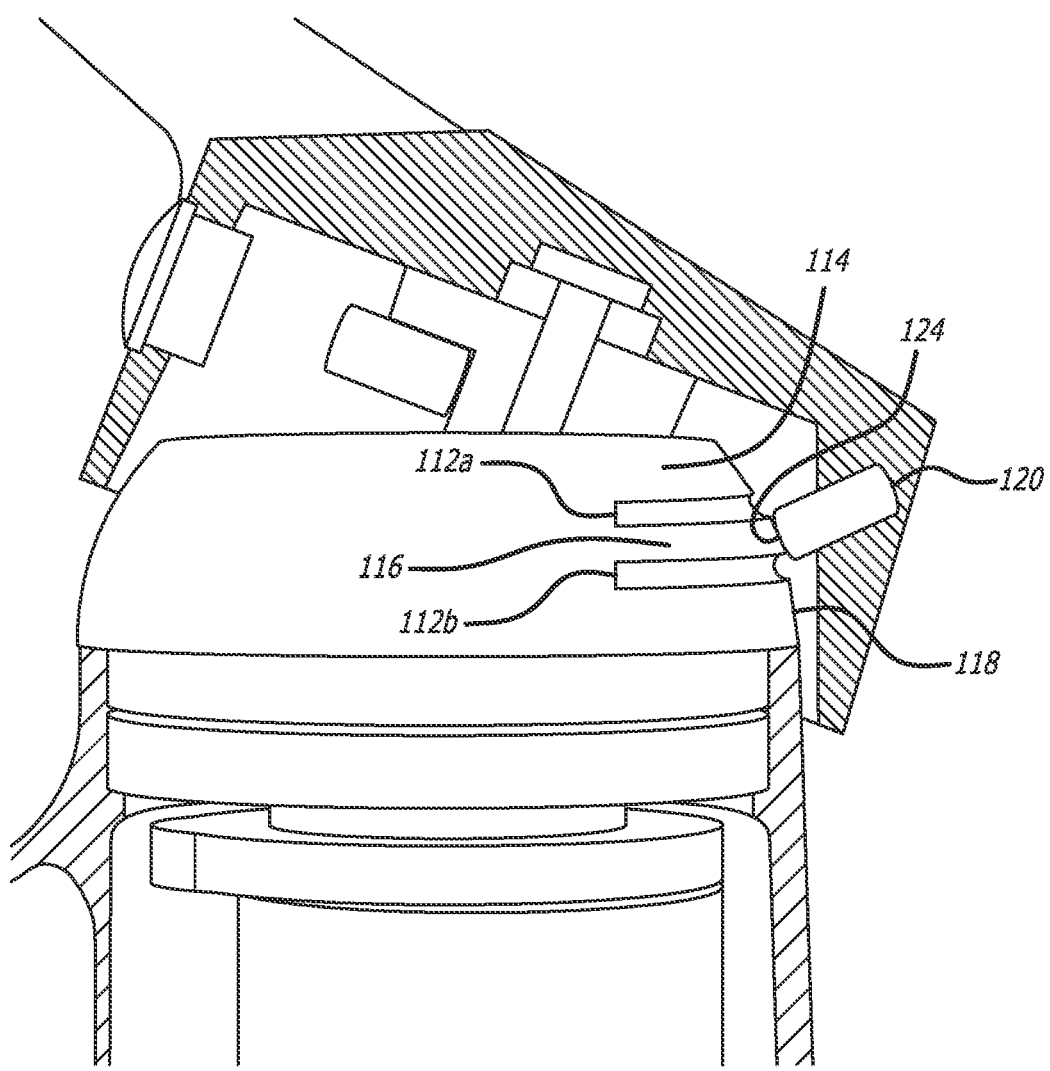
FIG. 10 is an enlarged partial cross-sectional view of the lever faucet illustrating the ball plunger transitioning from the first position toward the second position with the flow of water being approximately 66% in accordance with the present invention.

FIGS. 5 and 6 show a cross section of faucet 100 with valve assembly 108 and valve body cover 110. Valve body cover 110 is positioned over at least a portion of valve assembly 108 and has detent grooves 112a and 112b. Grooves 112a and 112b are formed in the valve cover 110 and in a preferred embodiment partially encircle valve body cover 110. The positioning of grooves 112a and 112b is within the normal range of motion of the handle relative to valve body cover 110 when operating faucet 100. In use, handle 102 is rotated from left to right to adjust the water temperature between hot and cold and pivoted up-and-down off between the off position to the maximum on position. Grooves 112a and 112b are sized and configured to receive a portion of ball 124 when positioned therein.

Handle 102 includes a plunger bore 130 configured to receive ball plunger body 122 therein. When ball plunger 120 is positioned within bore 130, ball 124 is oriented to face and be maintained in position to contact the surface of valve body cover 110.

Referring to FIGS. 7-10, handle 102 is shown in the off position with a flow rate of 0% where no water is flowing from faucet 100. As handle 102 is moved from the off position towards the maximum on position, ball 124 travels along the surface 114 of valve body cover 110 into detent groove 112a and is in first fixed position 150. When ball 124 rolls (or slides) into detent groove 112a, the user feels a "click" sensation through handle 102 from ball 124 from the spring biased ball plunger being seated within groove 112a which provides a tactile feedback mechanism indicating to the user that that handle 102 is in first position 150.

In a preferred embodiment of faucet 100, when handle 102 is in first fixed position 150 the water flow rate is at approximately 33% of the maximum flow of water for the maximum on position for faucet 100. When handle 102 is further moved toward the maximum on position, ball 124 moves out of detent groove 112a and travels along surface 116 of valve body cover 110 between the two detent grooves 112a and 112b to reach second detent groove 112b and stops in the second position 160 when ball 124 is seated in groove 112b. In second position 160, the water flow rate is approximately 66% of the maximum for faucet 100.

During movement of handle 102, as described above the user receives tactile feedback through handle 102 indicating the position of handle 102 as it moves from one groove and into the next groove. In addition to tactile feedback, handle 102 provides visual feedback to the user as handle 102 remains in the fixed position until the user chooses to move handle 102 to another position.

When handle 102 is further moved toward the maximum on position, ball 124 exits detent groove 112b and contacts surface 118 of valve body cover 110 and handle 102 eventually reaches its maximum travel. At this point, handle 102 cannot move any further and is at the maximum on position of faucet 100. In the maximum on position, the water flow rate is 100% for faucet 100.

In each of first position 150, second position 160, and maximum on position 170, handle 102 remains in a fixed, pre-set position until it is moved by the user and eventually returned by the user to the off position. This permits the user to continue using the faucet while knowing the specific flow rate of the water flow by looking at the position of handle and feeling that the handle is fixed in a desired position. In each of the fixed positions, faucet 100 delivers specific water flow rates of 33%, 66%, and 100%, respectively, to stimulate conscious consumption behavior and reduce water usage with zero consumer impact.

It is appreciated that the position and number of grooves 112 can be altered to vary the number of preset positions or to vary the water flow to other rates in the range of 0% to 100% without departing from the spirit and scope of the present invention. For example, in an alternative embodiment three spaced apart grooves are provided at fixed settings of 25%, 50%, and 75% water flow rate. Other variations and combinations suitable for the intended purpose of pre-setting water flow rates are possible and contemplated as part of the present invention. It is appreciated that instead of grooves, other surface interruptions of the valve body cover 110 (or valve stem 210 described below) such as for example, ridges, serrations, notches, indentations and the like suitable for the intended purpose of cooperating with ball 124 to form and maintain fixed positions of handle 102 relative to valve cover 110 are contemplated to be within the scope of the present invention.

Referring to FIGS. 11-15, a second embodiment of the present invention is shown. Faucet 200 has a knob 202, a spigot 204, and a body 206. Within body 206 is a flow valve assembly 208 for controlling the flow of water from faucet 200. The flow rate can be controlled from an "off" (0% flow) position to a "maximum on" (100% flow) position, or at flow rates therebetween by rotating knob between the off and maximum on positions.

Figure 11:
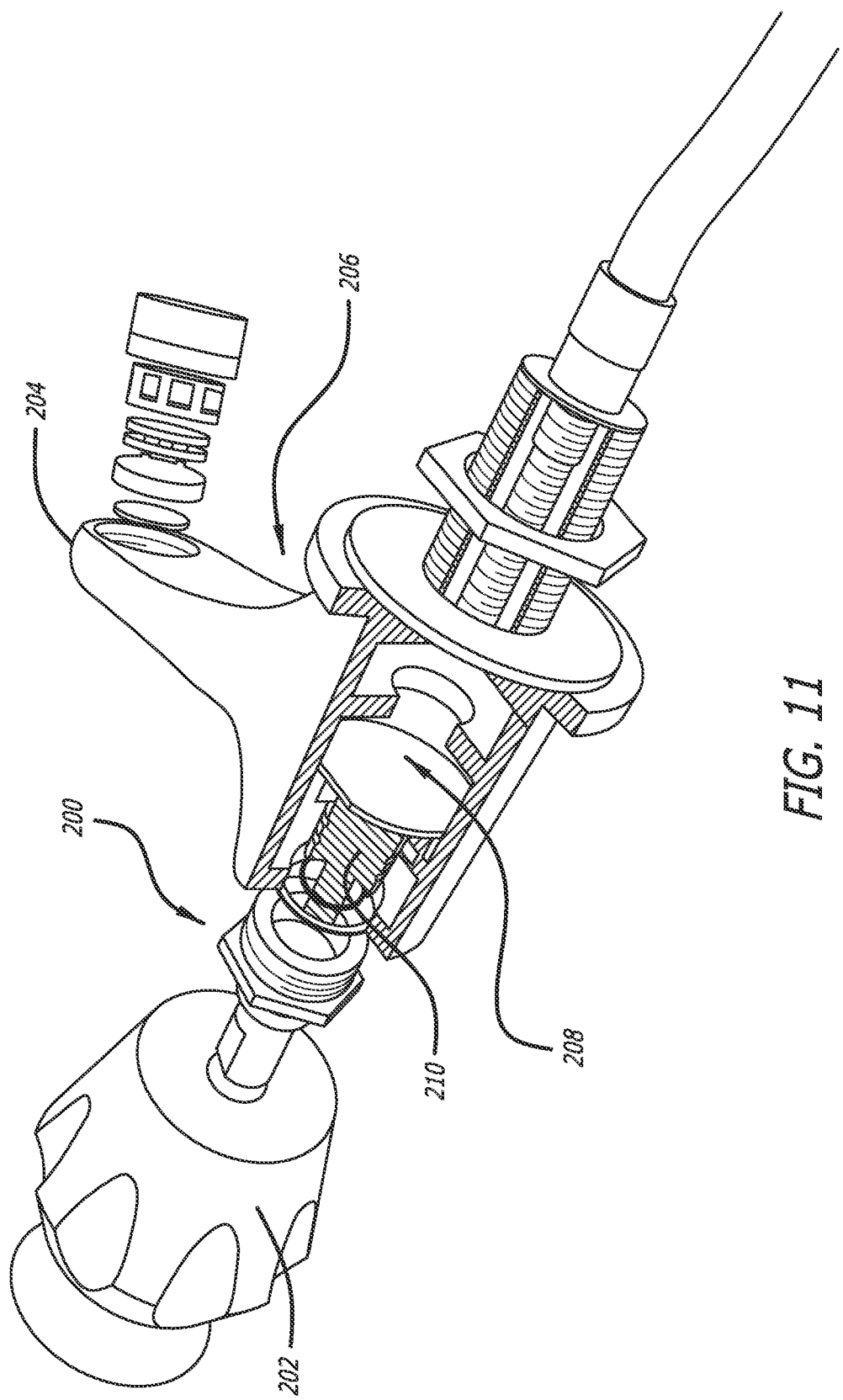
FIG. 11 is a partial cross-sectional view of a knob faucet illustrating another embodiment in accordance with the present invention.
Figure 12:
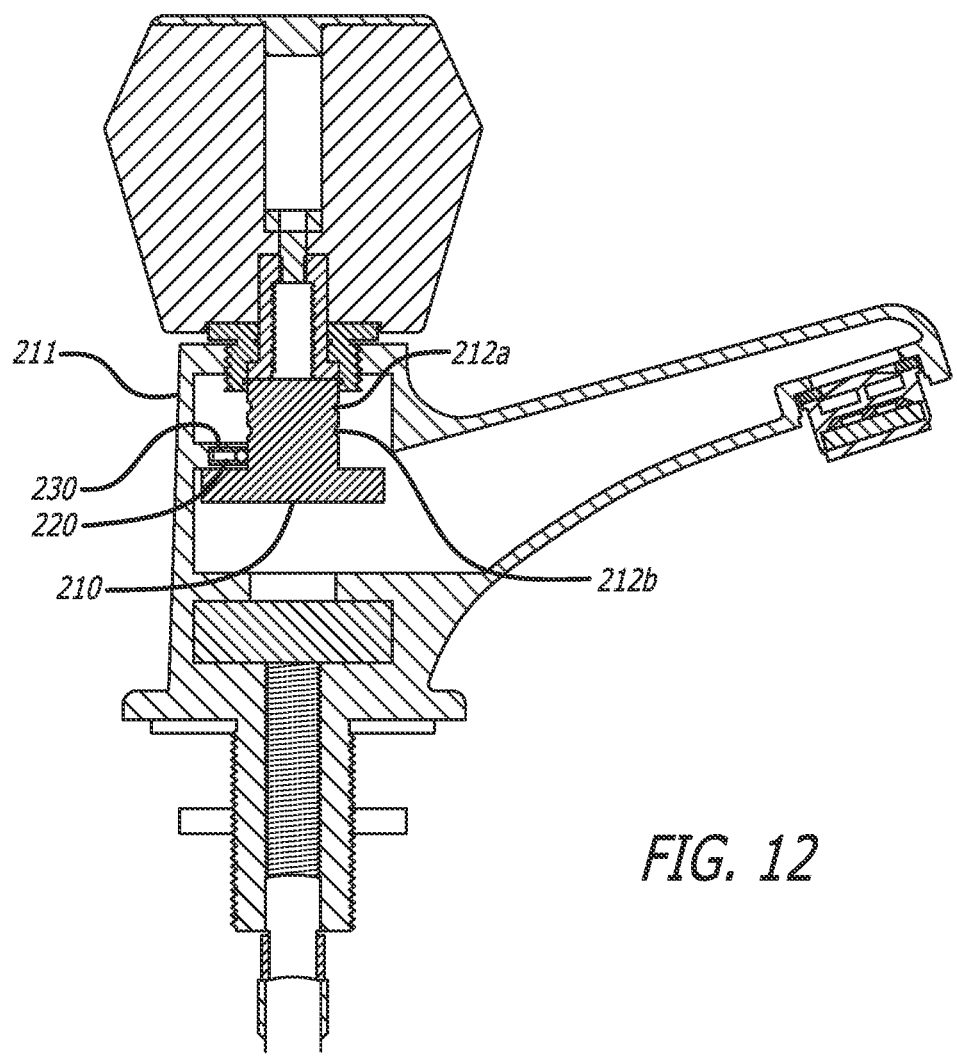
FIG. 12 is a partial cross-sectional side view of a knob faucet shown with the valve in the open position and the ball plunger in the maximum on position with the flow of water being 100% in accordance with the present invention.

FIGS. 11 and 12 show cross sections of faucet 200 with valve assembly 208 having a stem 210. Stem 210 is typically housed within a bonnet 211 and has detent grooves 212a and 212b. Grooves 212a and 212b are formed in stem 210 and in a preferred embodiment are annular grooves at least in part encircling a portion of stem 210. Alternatively, grooves 212a and 212b can be the spaces between stem threads normally found in conventional faucets with rotating knobs. Bonnet 211 includes a plunger bore 230 configured to receive ball plunger body 222 therein. When ball plunger 220 is positioned within bore 230, ball 224 is oriented to face and maintained in position to contact the surface of stem 210.

In use, knob 202 is rotated between the off position to the maximum on position. Grooves 212a and 212b are sized and configured to receive a portion of ball 224 when positioned therein. When knob 202 is in the off position, the flow rate is 0% and no water is flowing from faucet 200. As knob 202 is moved from the off position towards the maximum on position, ball 224 travels along the surface 214 of stem 210 into detent groove 212a and is in first fixed position 250. When ball 224 rolls (or slides) into detent groove 212a, the user feels a click sensation through knob 202 from ball 224 of the spring biased ball plunger 220 being seated in groove 212a which provides a tactile feedback mechanism indicating to the user that that knob 202 is in first position 250. In a preferred embodiment of faucet 200, when handle 202 is in first fixed position 250 the water flow rate is at approximately 33% of the maximum flow of water in maximum on position for faucet 200.

Figure 13:
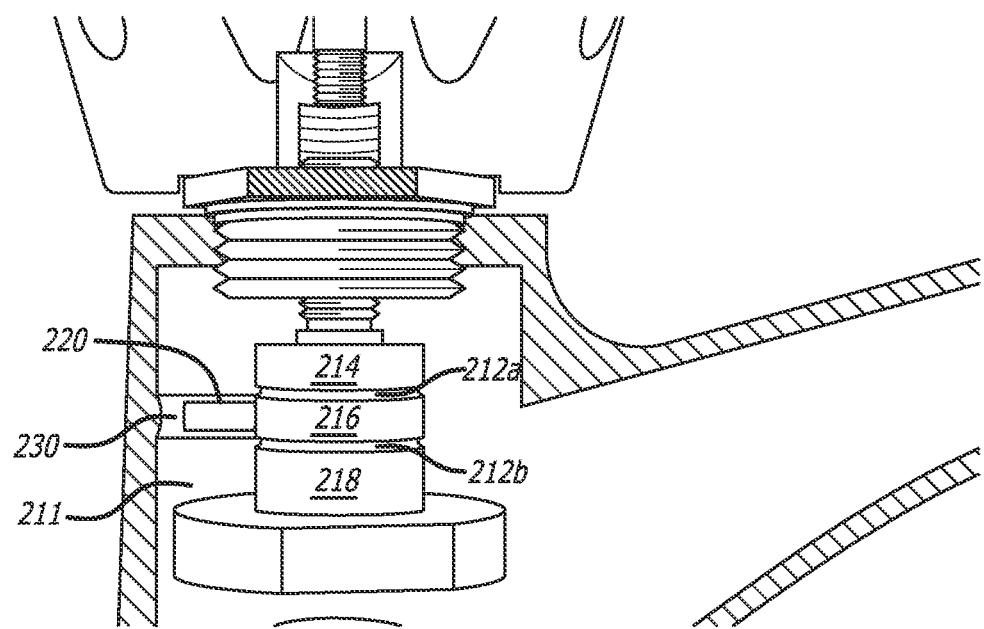
FIG. 13 is an enlarged partial cross-sectional view of a knob faucet illustrating the ball positioned between the first position and the second position in accordance with the present invention.
Figure 14:
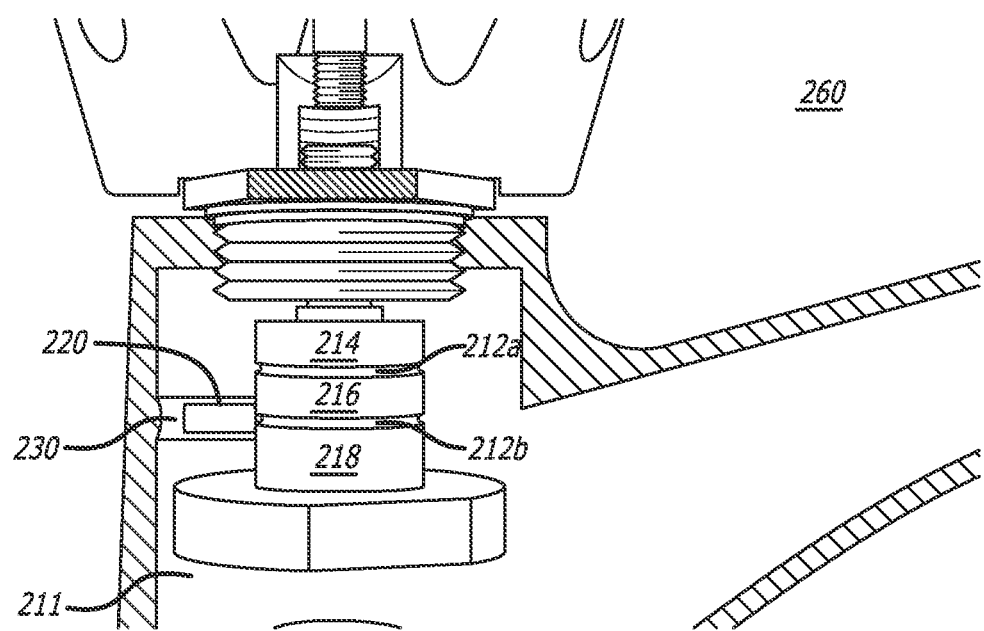
FIG. 14 is an enlarged partial cross-sectional view of a knob faucet illustrating the ball positioned in the second position with the flow of water being approximately 66% in accordance with the present invention.

As shown in FIGS. 13 and 14, when knob 202 is further rotated toward the maximum on position, ball 224 moves out of detent groove 212a and travels along surface 216 of stem 210 between two detent grooves 212a and 212b to reach second detent grove 212b and stops in the second position 260. In second position 260, the water flow rate is approximately 66% of the maximum for faucet 200.

During rotation of knob 202, the user receives tactile feedback through knob 202 indicating the position of knob 202 as it moves from one groove and into the next groove. In addition to tactile feedback, knob 202 provides visual feedback to the user as knob 202 remains in the fixed position until the user chooses to move knob 202 to another position.

Figure 15:
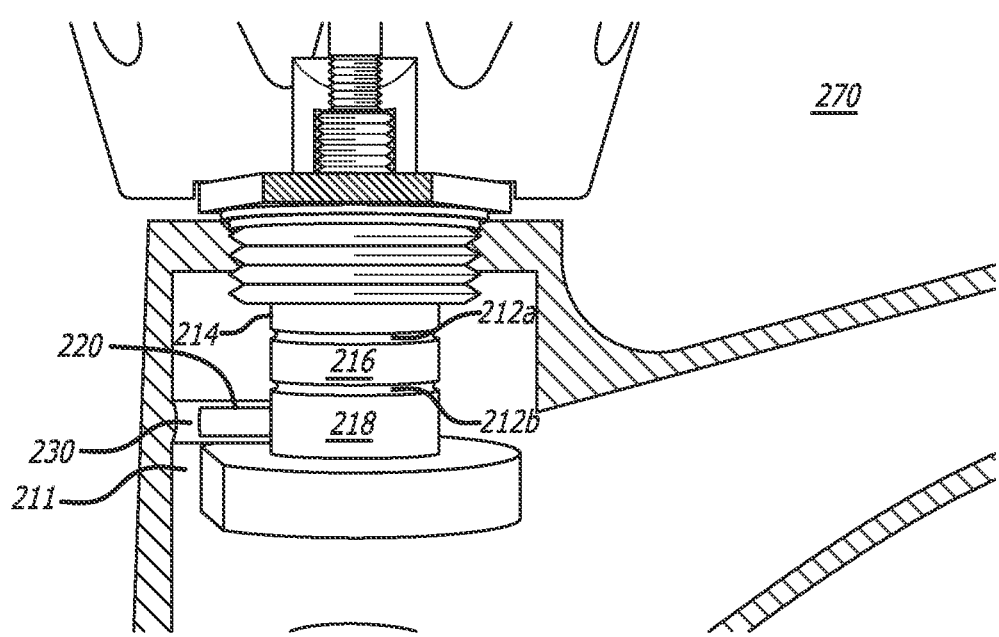
FIG. 15 is an enlarged partial cross-sectional view of a knob faucet illustrating the ball positioned in the maximum on position with the flow of water being 100% in accordance with the present invention.

As shown in FIG. 15, when knob 202 is further rotated toward the maximum on position, ball 224 exits detent groove 212b and contacts surface 218 of stem 210 and knob 202 eventually reaches its maximum travel. At this point, knob 202 cannot move any further and is at the maximum on position 270. In the maximum on position, the water flow rate is 100% for faucet 200.

In each of first position 250, second position 260, and maximum on position 270, knob 202 remains in a fixed position until it is moved by the user and eventually returned by the user to the off position. This permits the user to continue using the faucet while knowing the specific flow rate of the water flow by looking at the position of handle and feeling that handle is fixed in a desired position. In each of the fixed positions, faucet 100 delivers specific water flow rates of 33%, 66%, and 100%, respectively, to stimulate conscious consumption behavior and reduce water usage with zero consumer impact.

Figure 16:
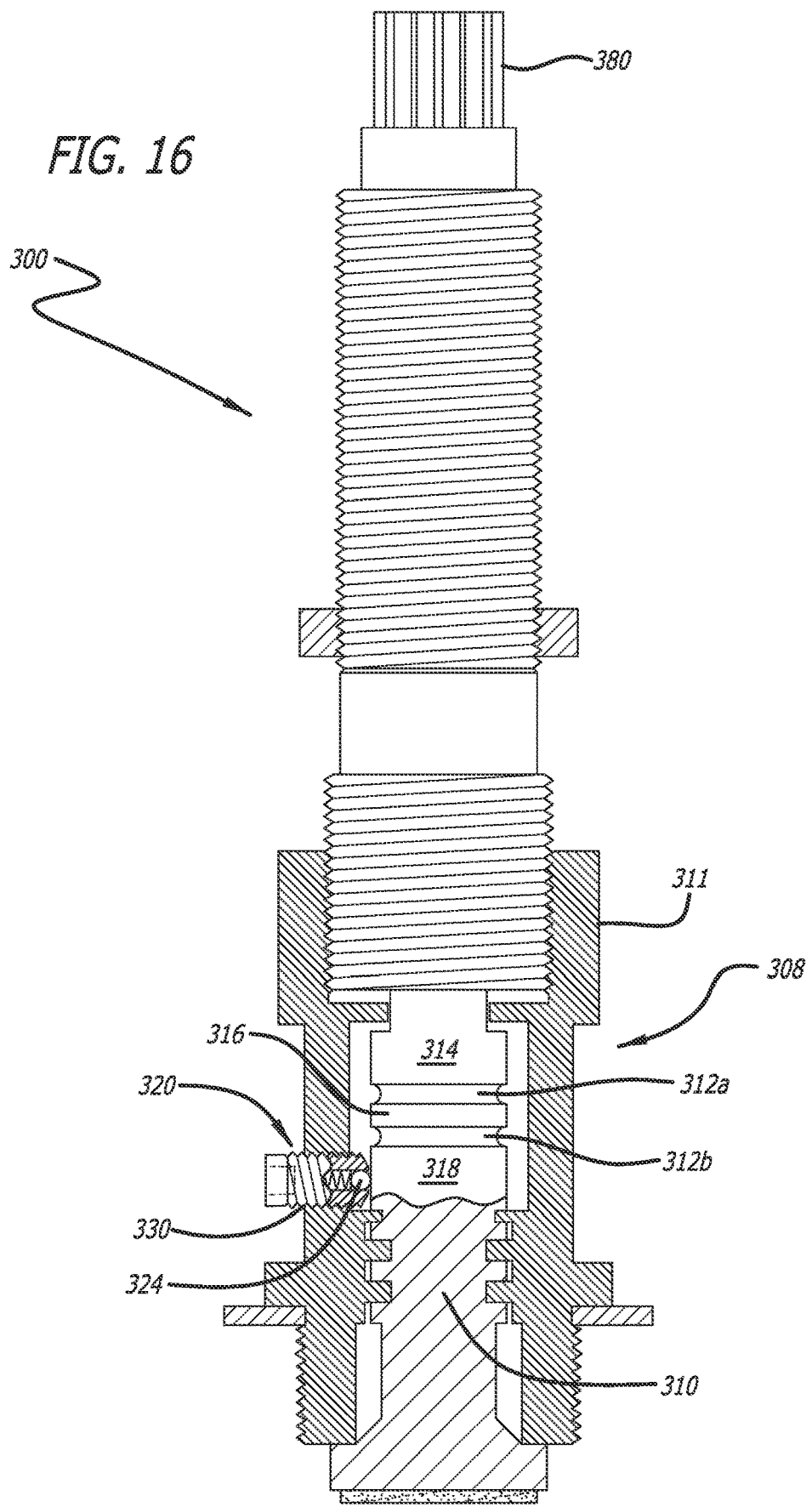
FIG. 16 is a cross-sectional view of a knob faucet illustrating another embodiment in accordance with the present invention.

FIG. 16 is a cross section of faucet 300 with valve assembly 308 having a stem 310. Stem 310 is typically housed within a bonnet 311 and has detent grooves 312a and 312b. Grooves 312a and 312b are formed in stem 310 and in a preferred embodiment are annular grooves at least in part encircling a portion of stem 310. Bonnet 311 includes a plunger bore 330 configured to receive ball plunger body 322 therein. When ball plunger 320 is positioned within bore 330, ball 324 is oriented to face and be maintained in position to contact the surface of stem 310.

In use, stem 310 is connected (preferably by handle splines 380) to a knob or handle. Stem 310 is rotated between the off position to the maximum on position. Grooves 312a and 312b are sized and configured to receive a portion of ball 324 when positioned therein. The operation of faucet 300 include water flow control and tactile feedback is similar to that described above for faucet 200 and is hereby incorporated by reference herein.

Figure 17:
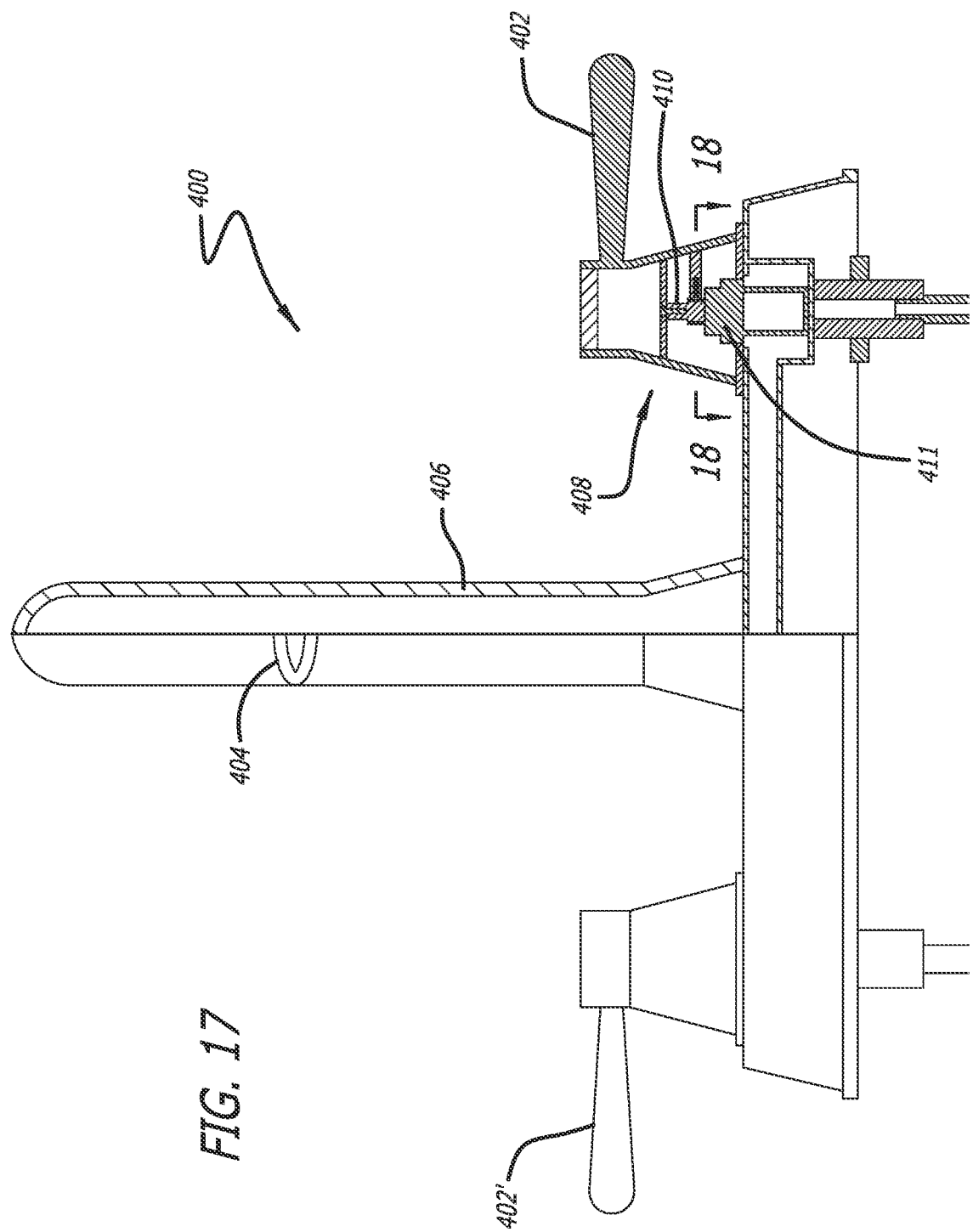
FIG. 17 is a partial cross-sectional view of a two-handle faucet illustrating another embodiment in accordance with the present invention.
Figure 18:
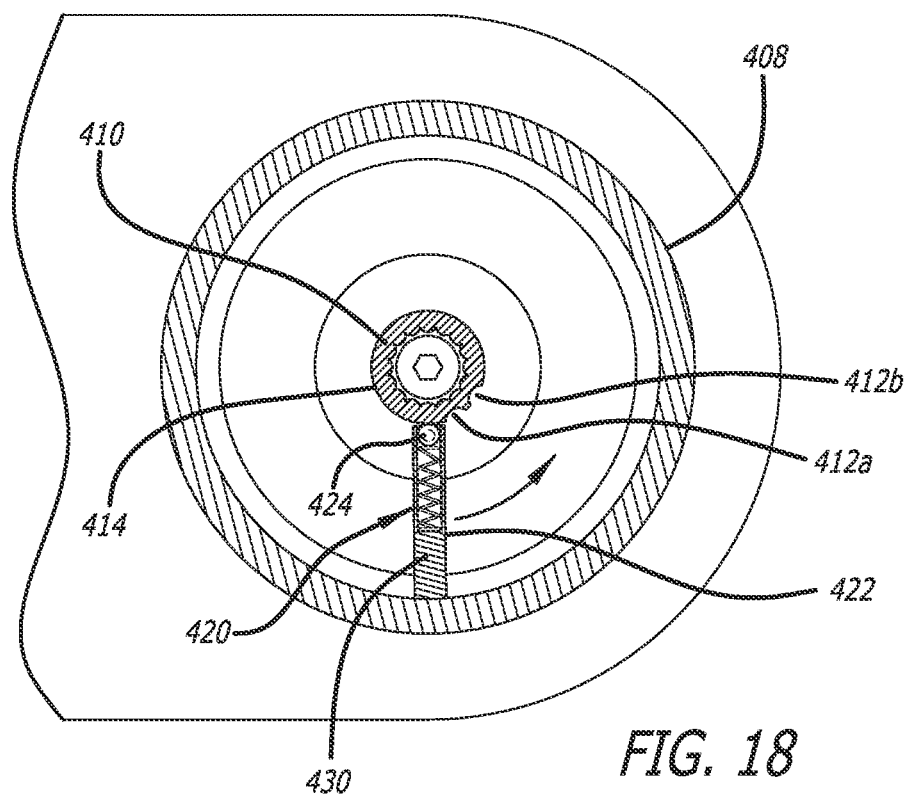
FIG. 18 is an enlarged partial cross-sectional view of the two-handle faucet along line 18-18 of FIG. 17 illustrating the ball plunger being moved from the off position in accordance with the present invention.
Figure 19:
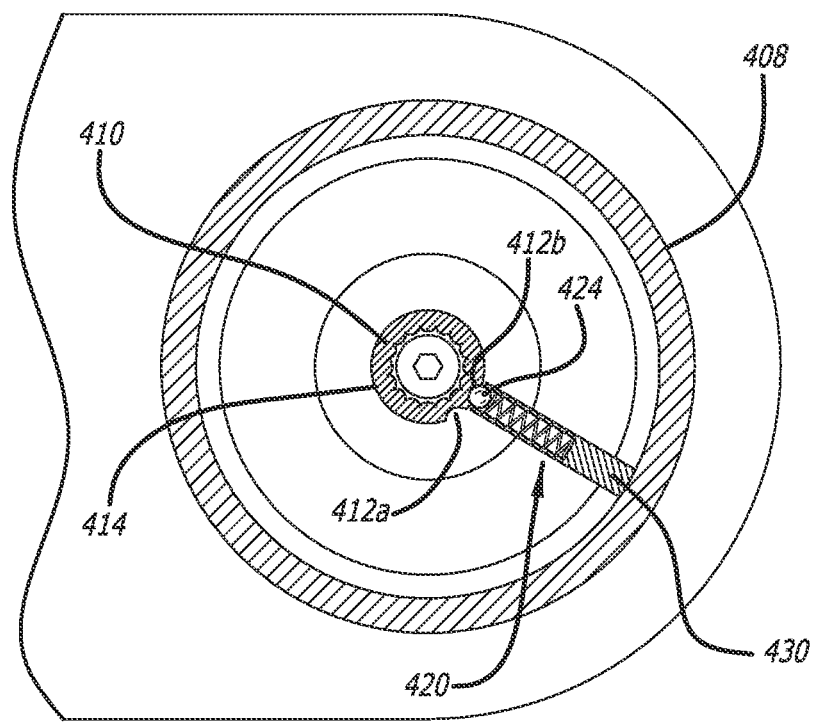
FIG. 19 is an enlarged partial cross-sectional view of the two-handle faucet along line 18-18 of FIG. 17 illustrating the ball positioned in the second position with the flow of water being approximately 66% in accordance with the present invention.

FIGS. 17-19 show another embodiment of a faucet 400 in accordance with the present invention having a two-handle configuration for controlling respective water supply lines. Faucet 400 has two handles-handle 402 and handle 402', a spigot 404, and a body 406. For simplicity, a description of the operation of faucet 400 is being made for only handle 402 to control the flow of a water supply with the understanding that such description applies equally to handle 402' as would be readily appreciated by a person of ordinary skill in the art.

Within body 406 is a flow valve assembly 408 for controlling the flow of water from a water supply line and through faucet 400. The flow rate can be controlled from an "off" (0% flow) position to a "maximum on" (100% flow) position, or at flow rates therebetween by rotating handle 402 between the off and maximum on positions. Typically, handle 402 would be used to control the flow of a cold water supply and handle 402' would be used to control the flow of a hot water supply. Hot water and cold water would flow through the same spigot 404 either individually or combined when flowing at the same time.

FIGS. 18 and 19 show cross sections of valve assembly 408 having a stem 410. Stem 410 is typically housed within a bonnet 411 and has detent grooves 412a and 412b. Grooves 412a and 412b are formed in stem 410 and in a preferred embodiment are annular grooves at least in part encircling a portion of stem 410. Bonnet 411 includes a plunger bore 430 configured to receive ball plunger body 422 therein. When ball plunger 420 is positioned within bore 430, ball 424 is oriented to face and maintained in a biased position to contact the surface 414 of stem 410.

In use, handle 402 is rotated between the off position to the maximum on position. Grooves 412a and 412b are sized and configured to receive a portion of ball 424 when positioned therein. When handle 402 is in the off position, the flow rate is 0% and no water is flowing from faucet 400. As handle 402 is moved from the off position towards the maximum on position, ball 424 travels along the surface 414 of stem 410 into detent groove 412a and is in first fixed position 450. When ball 424 rolls (or slides) into detent groove 412a, the user feels a click sensation through lever 402 from ball 424 of the spring biased ball plunger 420 being seated in groove 412a which provides a tactile feedback mechanism indicating to the user that that handle 402 is in a first fixed position 450. In a preferred embodiment of faucet 400, when handle 402 is in the first fixed position the water flow rate is at approximately 33% of the maximum flow of water in maximum on position for the respective water supply line.

As shown in FIG. 19, when handle 402 is further rotated toward the maximum on position, ball 424 moves out of detent groove 412a and travels along surface 416 of stem 410 between two detent grooves 412a and 412b to reach second detent grove 412b and stops in a second fixed position. In the second fixed position, the water flow rate is approximately 66% of the maximum for the respective water supply line.

During rotation of handle 402, the user receives tactile feedback through handle 402 indicating the position of handle 402 as it moves from one groove and into the next groove. In addition to tactile feedback, handle 402 provides visual feedback to the user as handle 402 remains in the fixed position until the user chooses to move handle 402 to another position.

When handle 402 is further rotated toward the maximum on position, ball 424 exits detent groove 412b and contacts the surface of stem 410 and handle 402 eventually reaches its maximum travel. At this point, handle 402 cannot move any further and is at the maximum on position. In the maximum on position, the water flow rate is 100% for the respective water supply line.

In each of first position, second position, and maximum on position, handle 402 remains in a fixed position until it is moved by the user and eventually returned by the user to the off position. This permits the user to continue using the faucet while knowing the specific flow rate of the water flow by looking at the position of the handle and feeling that handle is fixed in a desired position. In each of the fixed positions, faucet 400 delivers specific water flow rates of 33%, 66%, and 100%, respectively, to stimulate conscious consumption behavior and reduce water usage with zero consumer impact.

For all of the embodiments described herein or variations thereof, the ball plunger and groove system installs in existing faucet tooling and area dimensions without interference or disruption of valve control mechanisms existing in faucets currently in use. The ball plunger assembly is preferably a conventional press fit ball-nose spring plunger that is inexpensively produced (approximately $0.50-$1.00 per unit), widely sourced, and preferably made of environmentally resistant material.

The present invention reduces cost and energy usage while maintaining temperature and duration control. Can be used in multi-family housing, student housing, and hotels. The present invention provides a solution to managing costs and energy usage while meeting consumer expectations for temperature and duration control.

The present invention provides savings incremental to existing benefits from aerators and is expected to provide savings of 100 billion gallons preserved annually; 700,000 new homes supplied with water; 400 million kWh of energy conserved; and 200 million dollars saved.

The present invention provide the benefits and advantages of User-Controlled Duration; User-Controlled Temperature; Minimal Cost Impact; No Aesthetic Compromise; No Separate Installation; No Limitation on Location; and No Electrical Charging amongst others.

Figure 20:
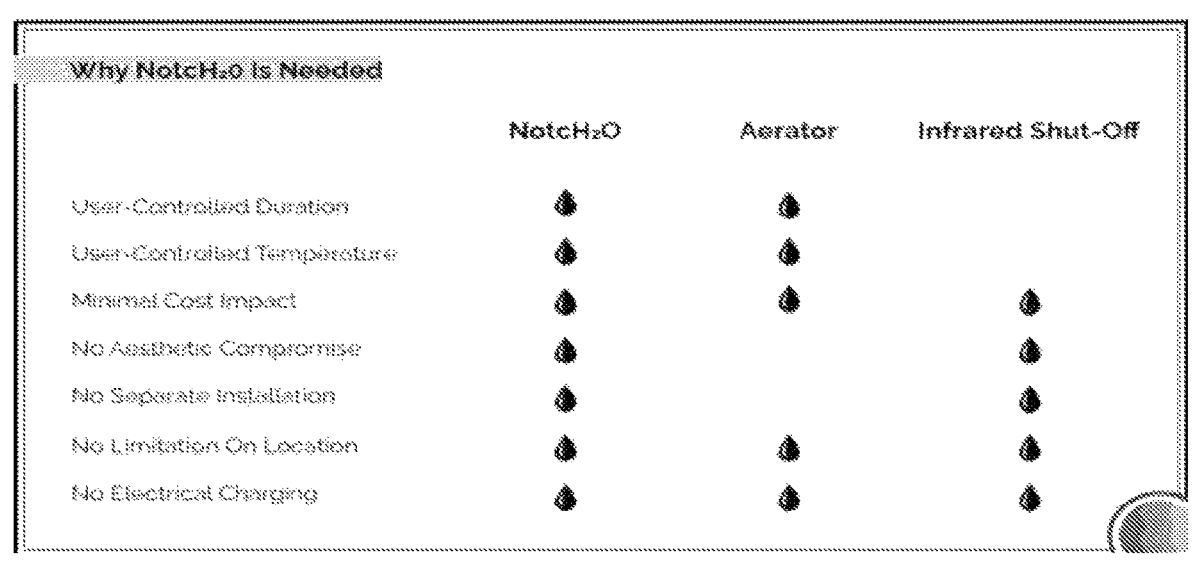

FIG. 20 is a table summarizing some of the benefits and advantages of the present invention.

The present invention builds on current faucet water conservation efforts such as the Energy Policy Act of 1992: 2.5 gpm at 80 psi for residential kitchen faucets; and 2.2 gpm at 60 psi for residential lavatory faucets. California Energy Commission of 2015 and California's Green Building Standards Code: A4.303.1: 1.8 gpm at 60 psi for residential kitchen faucets; and 1.2 gpm at 60 psi for residential lavatory faucets.

The foregoing outlines features of several embodiments so that those of ordinary skill in the art may better understand various aspects of the present disclosure. Those of ordinary skill in the art should appreciate that they may readily use the present disclosure as a basis for designing or modifying other processes and structures for carrying out the same purposes and/or achieving the same advantages of various embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described features (e.g., elements, resources, etc.), the terms used to describe such features are intended to correspond, unless otherwise indicated, to any features which performs the specified function of the described features (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. A water conservation faucet, the faucet comprising:
   a handle;
   a flow valve assembly, the flow valve assembly comprising:
      a valve body having a water input and a water output, and
      a flow valve disposed in the valve body, the flow valve controlling the flow of water from the faucet with a lever by movement of the lever;
   a ball plunger assembly including a ball biased by a spring mechanism, the spring mechanism biasing the ball while also permitting the ball to rotate relative to a plunger body;
   a valve body cover positioned over at least a portion of the valve assembly, the valve body cover including an exterior surface and a plurality of detent grooves at least partially encircling the valve body cover, the grooves being sized and configured to receive a portion of the ball when positioned therein,
   wherein when the handle is moved from the off position towards the maximum on position, the ball travels along the surface of the valve body cover into a first of the detent grooves and is in the first fixed position, the handle remains in the first position;
   wherein during movement of the handle the user feels a tactile sensation through the handle from the ball being seated within the first groove which provides a tactile feedback mechanism indicating to the user that that handle is in the first position;
   wherein when the handle is further moved toward the maximum on position, the ball exits the first detent groove and travels along the surface of valve body cover and into at least a second of the detent grooves and is in the second fixed position;
   wherein when the handle is further moved to eventually reach its maximum travel and the handle cannot move any further and is at the maximum on position of faucet where the water flow rate is at 100% for the faucet;
   wherein the handle continues to provide tactile feedback to the user through the handle indicating the position of the handle as it moves from one of the grooves and into a next one of the grooves; and wherein in addition to the tactile feedback, the handle provides a visual feedback to the user as the handle remains in the fixed position until the user chooses to move the handle to another position.

2. The water conservation faucet of claim 1, wherein when the handle is in the first fixed position, the water flow rate is at approximately 33% of the maximum flow of water for the maximum on position for the faucet.

3. The water conservation faucet of claim 1, wherein when the handle is in the second fixed position, the water flow rate is approximately 66% of the maximum for the faucet.

4. The water conservation faucet of claim 1, wherein when the handle is in the maximum on position, the water flow rate is 100% for the faucet.

5. The water conservation faucet of claim 1, wherein when the handle is in the first fixed position, the water flow rate is at approximately 33% of the maximum flow of water for the maximum on position for the faucet, when the handle is in the second fixed position, the water flow rate is approximately 66% of the maximum for the faucet, and when the handle is in the maximum on position, the water flow rate is 100% for the faucet.

6. The water conservation faucet of claim 1, wherein when the handle is in the first fixed position, the water flow rate is at approximately 25% of the maximum flow of water for the maximum on position for the faucet, when the handle is in the second fixed position, the water flow rate is approximately 50% of the maximum for the faucet, when the handle is in a third fixed position, the water flow rate is approximately 75% of the maximum for the faucet, and when the handle is in the maximum on position, the water flow rate is 100% for the faucet.

7. A rotating knob water conservation faucet, the faucet comprising:
- a knob;
- a flow valve assembly, the flow valve assembly comprising:
- a valve body having a water input and a water output, and
- a flow valve disposed in the valve body, the flow valve controlling the flow of water from the faucet with a lever by rotational movement of the lever about its longitudinal axis;
- a ball plunger assembly including a ball biased by a spring, the spring mechanism biasing the ball while also permitting the ball to rotate relative to a plunger body;
- a bonnet having a plunger bore configured to receive the plunger body therein;
- a stem housed within the bonnet, the stem having an exterior surface with detent grooves formed therein, the grooves at least in part encircling a portion of the stem, the grooves being sized and configured to receive a portion of the ball when positioned therein, when the ball plunger is positioned within the plunger bore, the ball is oriented to face and is maintained in position to contact the surface of the stem;

wherein when the knob is rotated from the off position towards the maximum on position, the ball travels along the surface of the stem surface into a first of the detent grooves and is in the first fixed position, the knob remains in the first position;

wherein during rotation of the knob the user feels a tactile sensation through the knob from the ball being seated within the first groove which provides a tactile feedback mechanism indicating to the user that that is knob in the first position;

wherein when the knob is further rotated toward the maximum on position, the ball exits the first detent groove and travels along the surface of the stem surface and into at least a second of the detent grooves and is in the second fixed position;

wherein when the knob is further rotated to eventually reach its maximum travel and the knob cannot move any further and is at the maximum on position of faucet where the water flow rate is at 100% for the faucet;

wherein the knob continues to provide tactile feedback to the user through the knob indicating the position of the as it moves from one of the grooves and into a next one of the grooves; and wherein in addition to the tactile feedback, the knob provides a visual feedback to the user as the remains in the fixed position until the user chooses to move the knob to another position.

8. The rotating knob water conservation faucet of claim 7, wherein when the knob is in the first fixed position, the water flow rate is at approximately 33% of the maximum flow of water for the maximum on position for the faucet.

9. The rotating knob water conservation faucet of claim 7, wherein when the knob is in the second fixed position, the water flow rate is approximately 66% of the maximum for the faucet.

10. The rotating knob water conservation faucet of claim 7, wherein when the knob is in the maximum on position, the water flow rate is 100% for the faucet.

11. The rotating knob water conservation faucet of claim 7, wherein when the knob is in the first fixed position, the water flow rate is at approximately 33% of the maximum flow of water for the maximum on position for the faucet, when the knob is in the second fixed position, the water flow rate is approximately 66% of the maximum for the faucet, and when the knob is in the maximum on position, the water flow rate is 100% for the faucet.

12. The rotating knob water conservation faucet of claim 7, wherein when the knob is in the first fixed position, the water flow rate is at approximately 25% of the maximum flow of water for the maximum on position for the faucet, when the knob is in the second fixed position, the water flow rate is approximately 50% of the maximum for the faucet, when the knob is in a third fixed position, the water flow rate is approximately 75% of the maximum for the faucet, and when the knob is in the maximum on position, the water flow rate is 100% for the faucet.

* * * * *

UNITED STATES PATENT AND TRADEMARK OFFICE
CERTIFICATE OF CORRECTION

Page 1 of 1

PATENT NO. : 12,259,046 B2
APPLICATION NO. : 18/405838
DATED : March 25, 2025
INVENTOR(S) : Sydney Banks et al.

It is certified that error appears in the above-identified patent and that said Letters Patent is hereby corrected as shown below:

In the Claims

Column 14, Lines 8-9: change "feedback mechanism indicating to the user that that is knob" to --feedback mechanism indicating to the user that the knob--

Column 14, Lines 21-22: change "the user through the knob indicating the position of the as it moves" to --the user through the knob indicating the position of the knob as it moves--

Column 14, Line 25: change "provides visual feedback to the user as the remains in" to --provides visual feedback to the user as the knob remains in--

Signed and Sealed this
Ninth Day of December, 2025

John A. Squires
*Director of the United States Patent and Trademark Office*